(12) United States Patent  
Miller

(10) Patent No.: US 7,051,041 B1
(45) Date of Patent: May 23, 2006

(54) SIMPLIFIED RELATIONAL DATABASE EXTENSION TO DBM HASH TABLES AND METHOD FOR USING SAME

(75) Inventor: Thomas M. Miller, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 452 days.

(21) Appl. No.: 10/273,990

(22) Filed: Oct. 21, 2002

(51) Int. Cl.
*G06F 7/00* (2006.01)
(52) U.S. Cl. ..................................... 707/102
(58) Field of Classification Search ................ 707/102
See application file for complete search history.

(56) References Cited

U.S. PATENT DOCUMENTS

| | | | |
|---|---|---|---|
| 5,446,858 A | | 8/1995 | Copeland et al. ........... 395/427 |
| 5,799,310 A | * | 8/1998 | Anderson et al. ........... 707/102 |
| 5,832,508 A | * | 11/1998 | Sherman et al. ............ 707/200 |
| 5,960,438 A | * | 9/1999 | Chang et al. ........... 707/103 R |
| 6,012,067 A | * | 1/2000 | Sarkar ................... 707/103 R |
| 6,058,389 A | * | 5/2000 | Chandra et al. ................ 707/1 |
| 6,370,541 B1 | * | 4/2002 | Chou et al. ............. 707/103 X |
| 6,377,948 B1 | | 4/2002 | Kikuchi et al. ............... 707/10 |
| 6,697,794 B1 | * | 2/2004 | Milby ........................... 707/2 |
| 6,745,209 B1 | * | 6/2004 | Holenstein et al. .......... 707/203 |
| 6,785,677 B1 | * | 8/2004 | Fritchman ....................... 707/6 |
| 6,907,422 B1 | * | 6/2005 | Predovic ......................... 707/2 |
| 2002/0138353 A1 | * | 9/2002 | Schreiber et al. .............. 705/26 |
| 2003/0028451 A1 | * | 2/2003 | Ananian ........................ 705/27 |
| 2003/0105746 A1 | * | 6/2003 | Stickler ........................... 707/3 |
| 2003/0140308 A1 | * | 7/2003 | Murthy ........................ 715/500 |

OTHER PUBLICATIONS

"Quick and dirty simple database (DBM) support", Making Hashes Persistant, http://w3.one.net/bilshell/perlclass/dbmsupport01.html, printed Jun. 28, 2002.
"Quick and dirty simple database (DBM) support", Opening a DBM Hash, http://w3.one.net/bilshell/perlclass/dbmsupport02.html, printed Jun. 28, 2002.
"Quick and dirty simple database (DBM) support", Using a DBM Hash, http://w3.one.net/bilshell/perlclass/dbmsupport03.html, printed Jun. 28, 2002.
"DBM files for user authentication", p.p. 1-2, http://www.uniovi.es/rivero.mirror/apache-docs/auth_dbm.html, printed Jun. 28, 2002.
"Apache documentation", Apache User's Guide, http://www.uniovi.es/rivero/mirror/apache-docs/, printed Jun. 28, 2002.

(Continued)

*Primary Examiner*—Wayne Amsbury

(57) ABSTRACT

DBM files represent a quick and relatively standard method of retrieving data. The DBM files essentially contain a two-column table representing a key/value pair. The simplified relational database extension (SRDE) design described herein extends the value column to be further divided into indexed columns that can be manipulated using a modified SQL interface. SRDE offers a simple setup and maintenance scheme, provides a rich set of regular expression matching that can be applied to all searches.

41 Claims, 10 Drawing Sheets

OTHER PUBLICATIONS

Browne, Christopher B., "NonRelational Database Systems", p.p. 1-3, http://vip.hex.net/cdbrowne/nonrdbms.html, printed Jun. 28, 2002.

"Quick and dirty simple database (DBM) support", Closing a DBM Hash, http://w3.one.net/bilshell/perlclass/dbmsupport04.html, printed Jun. 28, 2002.

Kilgallon, Bill, "Compuw are Perl Class Syllabus", p.p. 1-4, http://w3.one.net/bilshell/perlclass/syllabus.html, printed Jun. 28, 2002.

"DBMFunctions Demo", p.p. 1-2, http://web.grml.org/www/phpexamples/demo_dbm.phtml, printed Jun. 28, 2002.

* cited by examiner

```
# !/usr/bin/perl

UNIX Header
require "/var/opt/client/lib/SRDE.pl";
$_dbdefdir = "/var/opt/client/DB/";

Windows Header
require  "\\mydir\\lib\\SRDE.pl";
$_dbdefdir  "\\apps\\client\\DB\\";

sub lookup_phone
{
   local ($name)  =  @_;
   local ($rc, $msg, $cols, @data) ;
   local (%rec) ;

($rc , $msg , $cols , @data) =
       &SQL("select * from client. phone where lname=$name") ;
   if ($rc) {
      print  "Lookup failed: Error [$rc] , $msg\n" ;
      return ($rc) ;
   }
   while  (@data) {
      %rec  =  &NextRecord ($cols,\@data) ;
      print   "Name: $rec{LNAME},$rec{FNAME} phone:$rec{PHONE}\n";
   }
   return (0) ;

} print "Please enter a name>>";
$name = <STDIN>;
chop ($name) ;
&lookup_phone ($name);
```

Labels: 201A (UNIX Header require line), 201B (Windows Header require line), 203 (sub lookup_phone), 205 (&SQL call)

*FIG. 2*

```
<command> ⎯⎯ 901
    ::=    ⎯902  ⎯904    ⎯906    ⎯908    ⎯910    ⎯912    ⎯914
       <create>|<delete>|<import>|<insert>|<export>|<select>|<update>

<column_list> ⎯⎯ 921
    ::=         ⎯922
       column_name [","[ column_name]]

<expression> ⎯⎯ 923
                          925
922 ⎯ ::=   ⎯⎯⎯⎯⎯⎯⎯⎯⎯⎯⎯⎯⎯⎯⎯⎯⎯⎯⎯      ⎯927
       column_name "="|"!="|"<"|">"|"<="|">="|"=~" quoted_value <procedure>
    ::=  ⎯928 ⎯930 ⎯932    ⎯936          ⎯922
       unique|sum|min|max|avg|count "(" column_name ")"
                            ⎯934  ⎯938
<create> ⎯⎯ 902A
    ::=
       database.table ⎯⎯ 941

<delete> ⎯⎯ 904A
    ::=
       from database.table
       [where <expression>
            [and|or]|
            <expression>]

<import> ⎯⎯ 906A
    ::=
       into database.table
       from filename
       [ merge | replace ]

<insert> ⎯⎯ 908A
    ::=
       into database.table
       set <expression>

<export> ⎯⎯ 910A
    ::=
       from database.table
       into filename
```

*FIG. 9A*

```
<select>  ⟋912A
    ::=
        <column_list>
            from database.table
            [where <expression>
                [and|or] |
                <expression>]
            [ sortby column_name ]
            [ join <column_list>
                from database.table
                where key=foreign_key ]
        | <procedure>
            from database.table
            [ where <expression>
                [ and | or ] |
                <expression> ]
```

```
⟋914A
<update>
    ::=
        <column_list
            from database.table
            set <expression>
            [ where <expression>
                [ and | or ] |
                <expression> ]
```

FIG. 9B though a DBM file with a hash key. Each record in the table has a unique hash key. This database methodology has been used for simple tables for many years, and is available on hundreds of different platforms. DBM is just a framework where one hash key is matched with one data field in another file. For instance, if a database full of names is desired, the hash key could be the last name. When a user types in "Miller", for instance, a unique record for Miller is returned. The DBM framework is a one-to-one system, i.e., there is one key for one record.

SIMPLIFIED RELATIONAL DATABASE EXTENSION TO DBM HASH TABLES AND METHOD FOR USING SAME

BACKGROUND

DBM is a method to index data between two files with a hash key. Each record in the table has a unique hash key. This database methodology has been used for simple tables for many years, and is available on hundreds of different platforms. DBM is just a framework where one hash key is matched with one data field in another file. For instance, if a database full of names is desired, the hash key could be the last name. When a user types in "Miller", for instance, a unique record for Miller is returned. The DBM framework is a one-to-one system, i.e., there is one key for one record.

The hash keys are in a hash table, and the data are just static records in a data file. Technically one could take the data file on its own with DBM and traverse it similar to the way one would traverse a flat file. The only difference between a DBM data file and the flat file is that the DBM data file has an index in another file that identified the offset of where to go to retrieve the data. A DBM file is just another way to access the data without having to use a whole database management system like Oracle® or Sybase®.

There are several database solutions today that extend DBM files, for instance Berkeley DB 1.85 and MySQL 3.23. Further information about Berkeley DB may be found at http://www.sleepycat.com and more information about MySQL can be found at http://www.mysql.com. Each of these systems has its advantages and disadvantages.

With the Berkley DB solution, the engine acts as a transport for the key/value pair. Indexing within the data area is not allowed, but can be accomplished using additional software. There are advantages with this method, i.e. abstraction of data, and de-referenced data types. Disadvantages include the following. The application must provide the interpretation for the data; it is not supplied directly. The Berkley DB process does not implement SQL, but is documented as an extension to the DBM hashing algorithm. If SQL is desired, it must be implemented as an additional layer. Searching is limited to the key and value pair, not regular expression matching is available directly. Since the distribution is a collection of C libraries, the source must be compiled for each platform. No binary distribution is known to be available as of the date of this writing.

MySQL requires the use of a database management server to handle the transactions. This server is responsible for managing all data transfer to and from the tables. The user of the server requires more technical knowledge from the administrator. It also requires specific processes to ensure that it initializes correctly and remains active after a system restart. MySQL installation is more complex and varies for each platform. Configuration files must be reviewed and edited. MySQL requires more than a basic knowledge of the internal processes to maintain data integrity. MySQL does support SQL, does not support regular expression matching on all fields defined in the table. MySQL requires the application developer to define the data types and sizes. MySQL trims string columns of trailing spaces.

SUMMARY

DBM files represent a quick and relatively standard method of retrieving data. The DBM files essentially contain a two-column table representing a key/value pair. The simplified relational database extension (SRDE) design outlined herein extends the value column to be further divided into indexed columns that can be manipulated using a modified SQL interface. SRDE offers a simple setup and maintenance scheme, provides a rich set of regular expression matching that can be applied to all searches, can be restructured quickly and easily, requires no strict type declarations, does not require a database management application, requires no special backup/recovery, and can be used on any platform supporting Perl and DBM.

A Perl script uses SQL calls directly into the database using native DBM commands and extends the hash table. There is a limit on what size records can be stored in DBM file. An embodiment of the present system and method uses external files to store larger records. An SQL parser accesses the DBM data as if it were a full relational database, but it doesn't need a database manager like most commercial database systems. All of the features of SQL are available to manage the DBM data. The extended database can be loaded on a server, for instance a web host service.

DESCRIPTION OF THE DRAWINGS

The detailed description will refer to the following drawings, wherein like numerals refer to like elements, and wherein:

FIG. 2 shows a sample lookup script for accessing data in a DBM database;

FIGS. 9A and 9B show an exemplary SQL syntax implemented for an embodiment of the present invention;

DETAILED DESCRIPTION

Figures 1, 3:
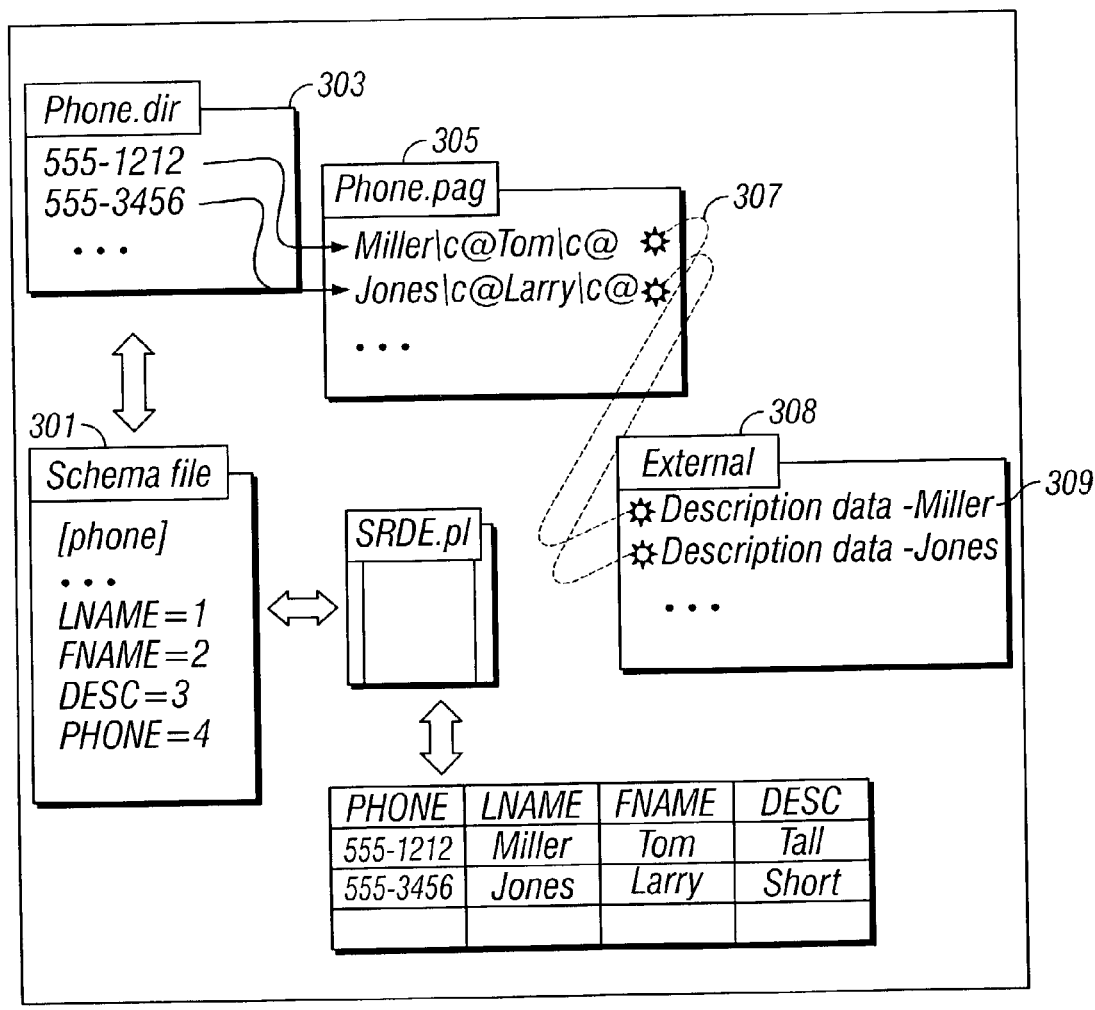
FIG. 1 shows a sample schema file, defining an exemplary DBM database.
FIG. 3 shows a block diagram illustrating a process overview for accessing a DBM database.

The present system and method solves several problems with methods of the prior art, including the requirements of a database manager service and strict data types. The use of a SQL interface allows the use of regular expression matching. The DBM is extended beyond 1024 byte key/value limit and table-level locking is implemented.

The present system and method does not require the use of a database manager running as a background process on the host machine. While a database (DB) manager can speed search and indexing times for transactions, it also complicates the database model somewhat. The DB manager forces applications to wait for its presence and proper functionality, essentially forcing a middleware process to handle transactions that the file system handles for present system and method.

The present system and method does not force the notion of data types on the calling application. An exemplary embodiment uses the powerful mapping functionality of Perl scripting language to load and maintain the data representation. The application can use the data however it need to. At no point in the process is data (externally) manipulated to fit data types. The data is returned as a vector array data stream. The library includes the capability for the application to dissect the data and deliver each row as an index array. In this way, specific data items can be referenced by column name and used in whatever context is required by the application.

An exemplary embodiment uses the Perl scripting language as an interface the DBM to provide a rich set of regular expression matching techniques. By using Perl, all the regular expression patterns are available in searching for data. This allows those managing the application to use the expressions they are already familiar with and not worry about the standard SQL syntax.

DBM is limited to 1024 bytes for each record to be shared with the key/value pair. An exemplary embodiment extends this limit by allowing a large data item to be maintained outside the DBM file pair. The placeholder is used to mark the column, but the schema directs the selection routine to an external location. In this way, large binary objects can be stored and indexed in the same way that simple text and numeric data can.

DBM does not provide a mechanism to lock multiple writes to the data. An exemplary embodiment of the present system and method uses a resource locking routine to lock writes and allow dirty reads of the data.

There are several advantages of the present system and method. No special backup and recovery procedures are required. Because no database service manager is required, managing the databases using the skills of a database administrator (DBA) are not required. Data can be moved easily from one platform to another. The present system and method has embedded functionality. File-system security, as implemented on host system, is used rather than adding an additional layer of security. Since a database management service is not used, setup is simplified. Table restructuring is simple and quick.

An exemplary embodiment is an extension of the DBM specification. Thus, the files can be stored and restored using any conventional storage device and software package. No recovery process is required to return the database to a normal level. Log files are available to review the status after a system event, but data is committed in real time, so there is no delay in the update sequence.

The present model is targeted for use in small, non mission-critical applications, where the expertise and expense of a large commercial database is not cost-effective. It is intended to be simple and easy to maintain, while still providing the functionality of a relational database. Individuals with minimal computer skills can now have a database that is transportable, extendable and easy to maintain.

Data files of the exemplary embodiment can be copied from one system or another without restructuring the data, as long as both systems implement DBM processing using the same specifications. In the event of a system failure, the database can be restored to another system and be accessed without installing any additional database software. The database can even be moved from a UNIX system to Windows™ or Linux by simply changing the directory path in the schema and copying the files.

By adding the require tag in a Perl application, the SQL calls are embedded automatically. For example, an application can use the SQL subroutine to issue commands to the database. The routine will return a return code and message for status. It will also return a vector array to be used by the calling process.

Internal security for the present system and method is not implemented. Instead, it uses the file system security to provide access to the tables. An Administrator does not need to learn a new security scheme to manage the database. This model will allow the application to add an additional layer of security before access may be granted.

The setup is made up of the following steps:
1. copy the library to any directory on the system;
2. create the schema using any standard text editor;
3. add the schema location and library references to the Perl scripts.

There is nothing to build, nothing to start, nothing to configure. The database is ready to simply start inserting, updating, deleting, importing, and exporting records.

When a change to a table is needed, i.e. add, or delete a column, all that is required is to define the new schema, issue the "restructure" command. Column names are only defined within the schema. To rename a column, simply edit the text in the schema file.

The database of an exemplary embodiment is composed of a key/value file pair representing the DBM .pag and .dir files. The .dir file contains the hash table for the data index and the .pag file contains the referenced data. An additional option is to use an external file to store data that may be larger that 1024 bytes. This external link is defined because DBM can only manage a record of 1024 bytes, including the key. A schema is used to define the column names and field separators within the data. Standard low-level lookup routines are used to retrieve and store the data items with the exception of the external data. Records are interrogated and compared with the SQL where clause on lookup and replacement.

Referring now the drawings, and in particular to FIG. 1, there is shown a sample schema file, defining an exemplary DBM database. The schema defines a phone 101 number table within the client database. It is stored in a location as defined by Dbfilename in /var/opt/phone/DB/phone 103. The data file has three columns 105, and the key for the hash table is the last name lname 107. The first column is the phone number 109. The second column is the first name fname 111. The third column is the last name lname 113.

The schema can be created by any text editor to define the database layout. The schema defines the directory location for the each table, the ownership definition and column names for external links, the number of columns, the key column, and the column names with their associated position. Below is an example of a phone number table within the client database.

This sample file could be saved as client.def, thus naming the database "client" and the table "phone". An example lookup is in the form:

select * from client.phone where lname=Miller.

The table can now be created using the SQL command create table.

Referring now to FIG. 2, there is shown a sample lookup script for accessing data in the DBM database. A "require" tag 201A and 201B is required to define the data location global variable $_dbdefdir to the Perl application script. This tells DBM where the database files are located. The Perl script defines a subroutine lookup_phone 203 to execute a phone number lookup in the phone table. The lookup function uses an SQL command 205 to effectuate the lookup.

Referring now to FIG. 3, there is shown a block diagram illustrating a process overview for accessing a DBM database. The present system and method utilizes the key/value pair to store and retrieve data, with the exception of external data, as discussed below. The schema 301 defines the data in the table 303 and 305. The table includes the key file 303 and the data file 305. A split character divides each record column in the data file 305. By default the character is ASCII 0 (NULL character), but it can be defined in the schema to be anything that is not used within the record data itself. If the data is large and must be stored externally, a pointer in the data file 307 identifies the external file and location 309.

When storing a long record externally, there is a tag on the external table for the column heading. This table is an additional file outside the data file. In DBM there is an index file, and there is a data file. In the extension provided by the present method and system, there is an index file 303, there is a data file 305, and then there is an additional data file 308. The data file is indexed on top with a column heading. The data falls below that. There is a different column heading down the table itself too. The data is stored in binary, but there are column headings in between the data. The external fields are defined in the schema.

When the database is defined, the fields that are going to be external fields outside the data file are identified. Within the record, within the hash, in the data file itself, the specified column heading will be blank. As the records are pulled in, a routine determines whether an external records has been requested. If so, the external record, is pulled in and added to this array. When an external record is selected, the routine performs the selection and the comparison for the requested criteria, then brings all of the data back in and it stores it in an associative array, so that each column in the associative array is indexed in memory.

In an exemplary embodiment, the filename is based on the table name. Suppose there is a table name called "employee." It is desired to store comments in the employee table. The comments can be large. In the directory where the DBM files are stored, there is an associated index file. There is a data file but also a directory is created when the table is built. The exemplary embodiment creates a directory called employee. In the employee directory, there is a file created for each record/key corresponding to the key field. Thus, DBM is similar to traditional relational databases where a unique key is necessary for each table. Within a database, there also needs to be a unique key for each table but the key does not necessarily have to be one of the table columns. It could be anything that can be unique.

The data manipulation implemented within the present system and method is centered on the SQL subroutine. Although direct access is available via the GetRecord and PutRecord routines, SQL is the basis for most transactions. FIGS. 4–7 illustrate the relationships to the library routines and the calling process. In an exemplary embodiment, the processes of FIGS. 4–7 are encoded in Perl script.

Figure 4:
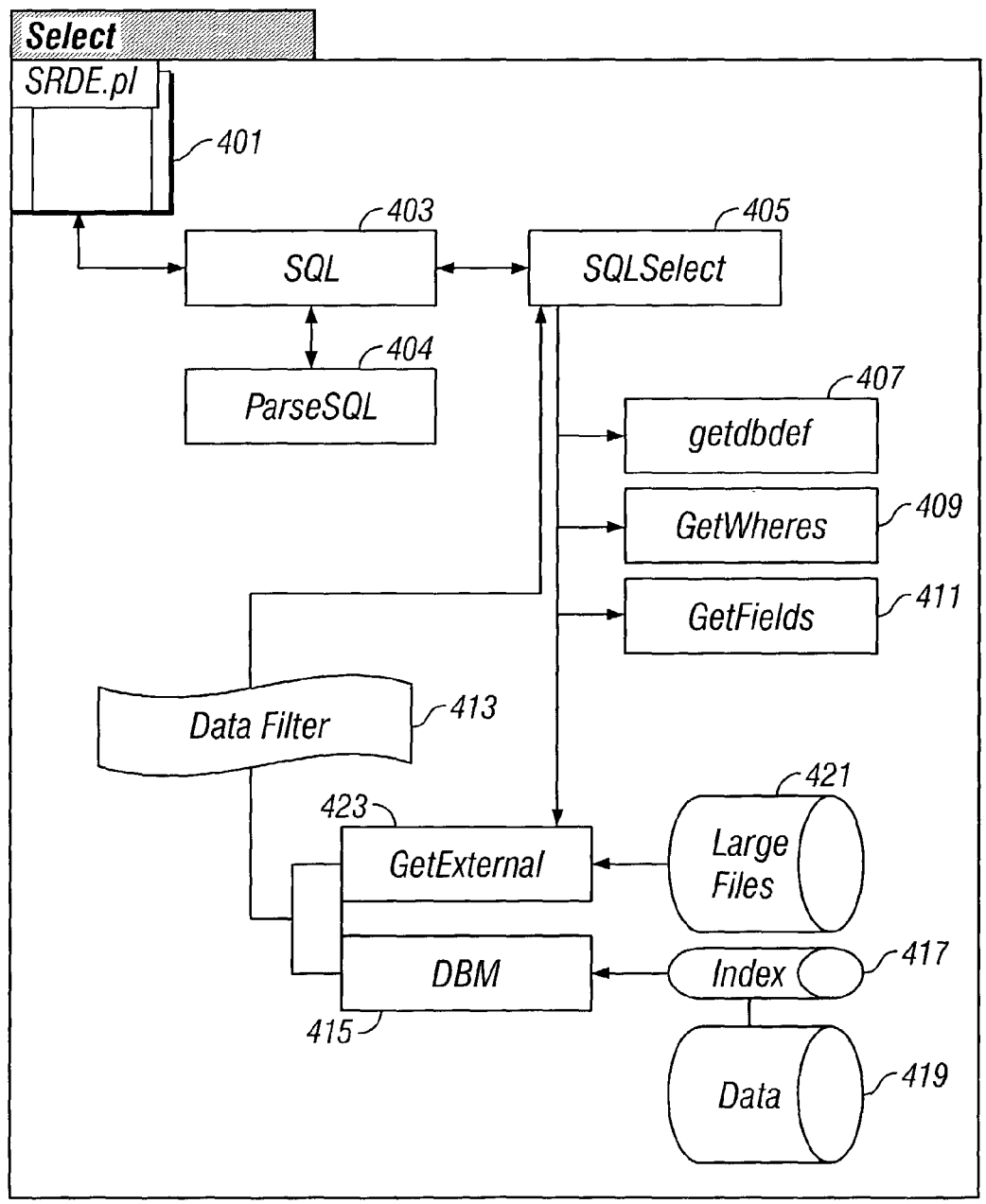
FIG. 4 illustrates the relationships to library routines and the calling process for a select function.

Referring now to FIG. 4, there is shown a process flow diagram for a Select function. First, the SRDE.pl library is loaded at 401. The SQL select call is made at 403. The SQL is parsed 404 and it is determined that a select call is made and is passed off to the SQL select routine 405. Processing the SQLSelect command requires the execution of a getdbdef 407, Getwheres 409, and Getfields 411. The data is filtered through a data filter 413. If the index points to an external file 421 for large data, the GetExternal routine 423 is used to access the data. Ultimately, the data is retrieved using native DBM commands 415 which access the index file 417 and the data file 419.

Figure 5:
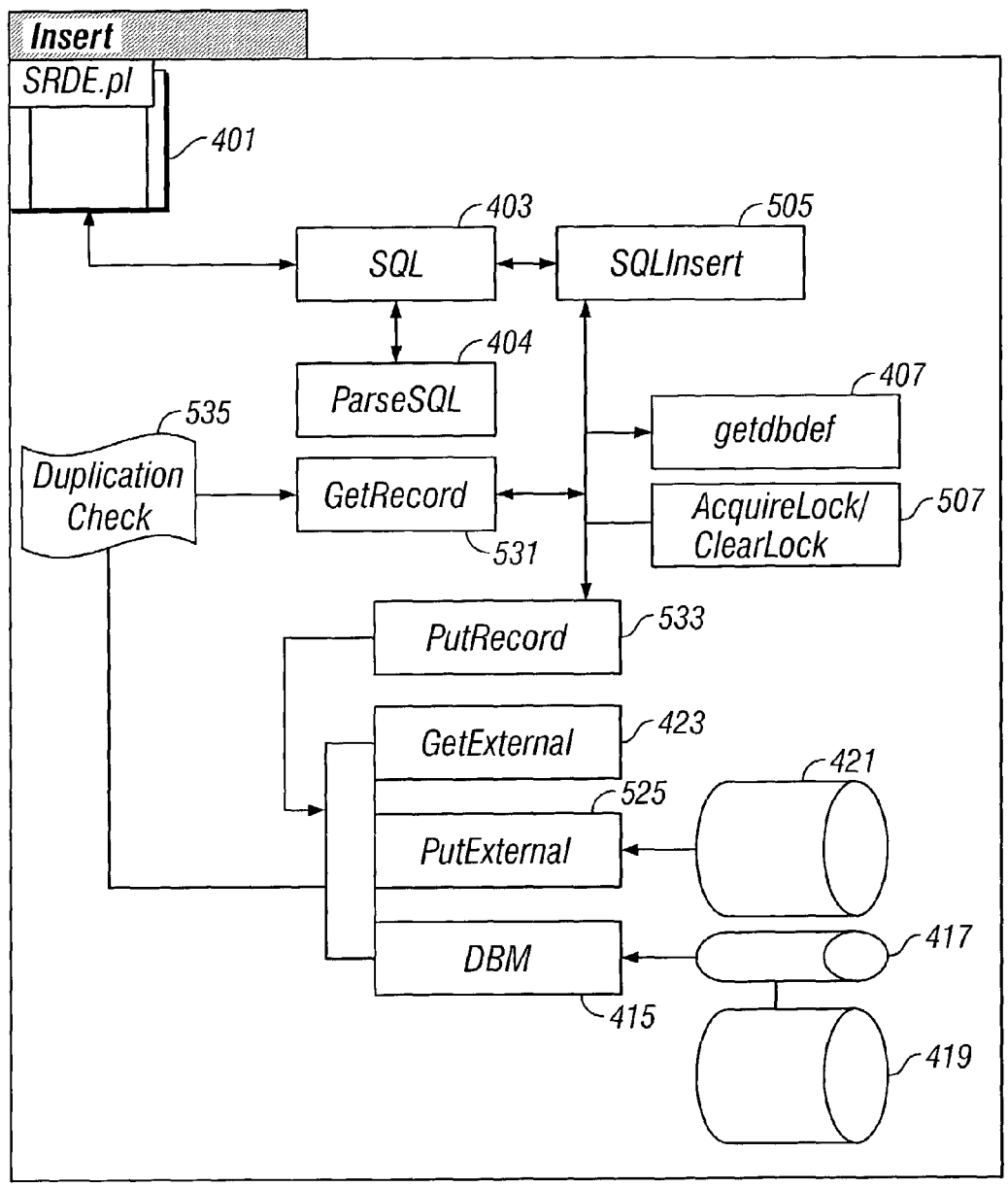
FIG. 5 illustrates the relationships to library routines and the calling process for a insert function.

Referring now to FIG. 5, there is shown a process flow diagram for an Insert function. First, the SRDE.pl library is loaded at 401. The SQL Insert call is made at 403. The SQL is parsed 404 and it is determined that an insert call is made and is passed off to the SQLInsert routine 505. An advantage of the present system and method over DBM is the ability to lock the database. It is necessary to lock the database before an Insert to maintain database integrity. Processing the SQLInsert 505 command requires the execution of a get-clbdef 407 to get the database definition information, and AcquireLock/ClearLock 507 command to lock or unlock the database. If the index points to an external file 421 for large data, the GetExternal routine 423 is used to access the data, and PutExternal 525 is used to put the data into the external file. Ultimately, the data is retrieved using native DBM commands 415 which access the index file 417 and the data file 419.

The GetRecord 531 and PutRecord 533 routines allow the calling process direct access to the table using the DBM hash key. GetRecord 531 uses the native DBM commands 415 to retrieve a record. The data is then coupled with any external data. After retrieval, the record is reformatted into an associative array. PutRecord 533 reformats the associative array into a DBM record, then uses the native DBM commands 415 to store the data into the DBM file. External data is then placed in the external record file 421. A check is made to ensure that a duplicate record is not added on insertion 535.

Figure 6:
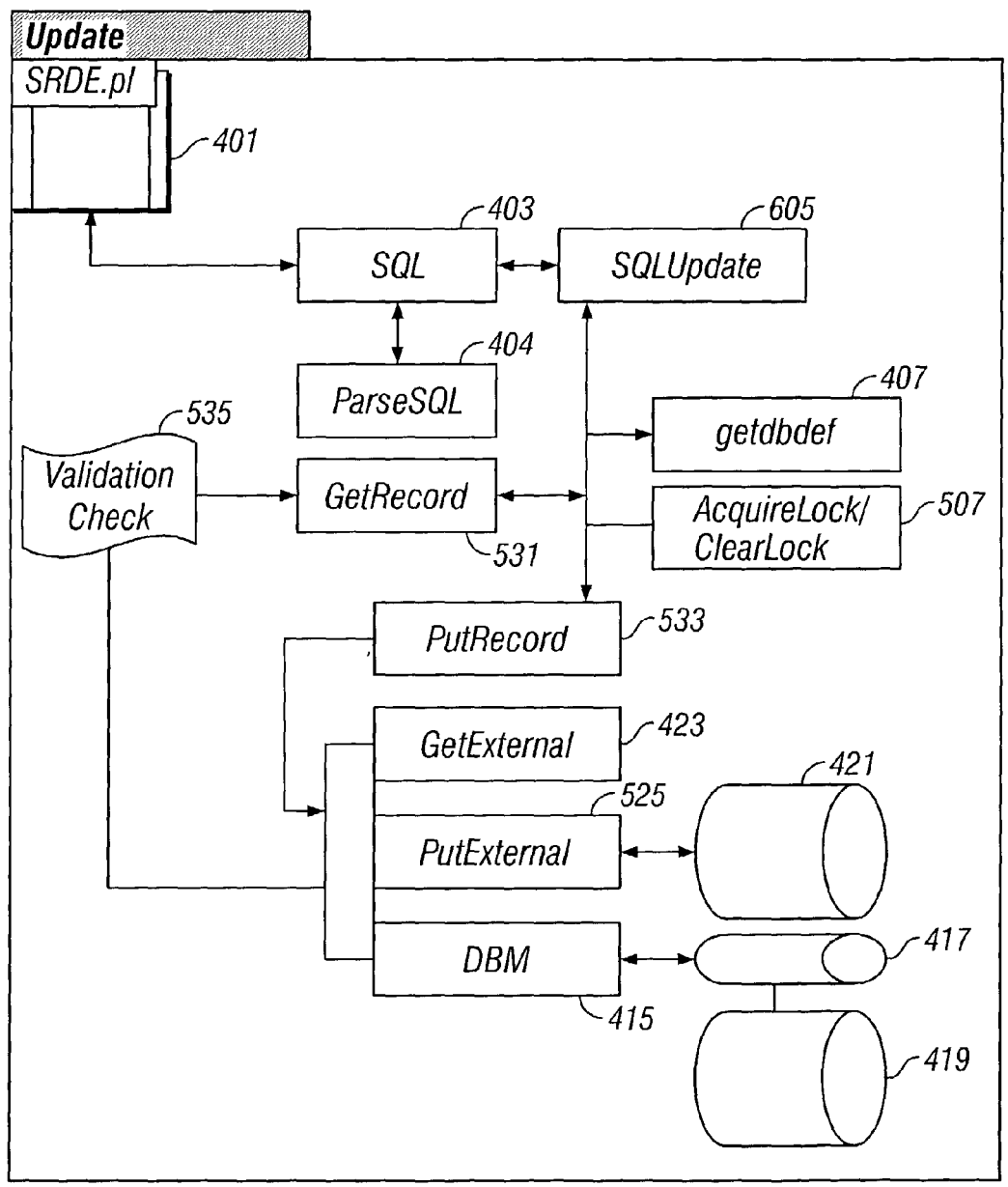
FIG. 6 illustrates the relationships to library routines and the calling process for a update function.

Referring now to FIG. 6, there is shown a process flow diagram for an Update function. First, the SRDE.pl library is loaded at 401. The SQL Update call is made at 403. The SQL is parsed 404 and it is determined that an Update call is made and is passed off to the SQL Update routine 605. It is necessary to lock the database before an Update to maintain database integrity. Processing the SQL Update 605 command requires the execution of a getdbdef 407 to get the database definition information, and AcquireLock/ClearLock 507 command to lock or unlock the database. If the index points to an external file 421 for large data, the GetExternal routine 423 is used to access the data, and PutExternal 525 is used to put the data into the external file. Ultimately, the data is retrieved using native DBM commands 415 which access the index file 417 and the data file 419.

The GetRecord 531 and PutRecord 533 routines allow the calling process direct access to the table using the DBM hash key. GetRecord 531 uses the native DBM commands 415 to retrieve a record. The data is then coupled with any external data. After retrieval, the record is reformatted into an associative array. PutRecord 533 reformats the associative array into a DBM record, then uses the native DBM commands 415 to store the data into the DBM file. External data is then placed in the external record file 421.

Figure 7:
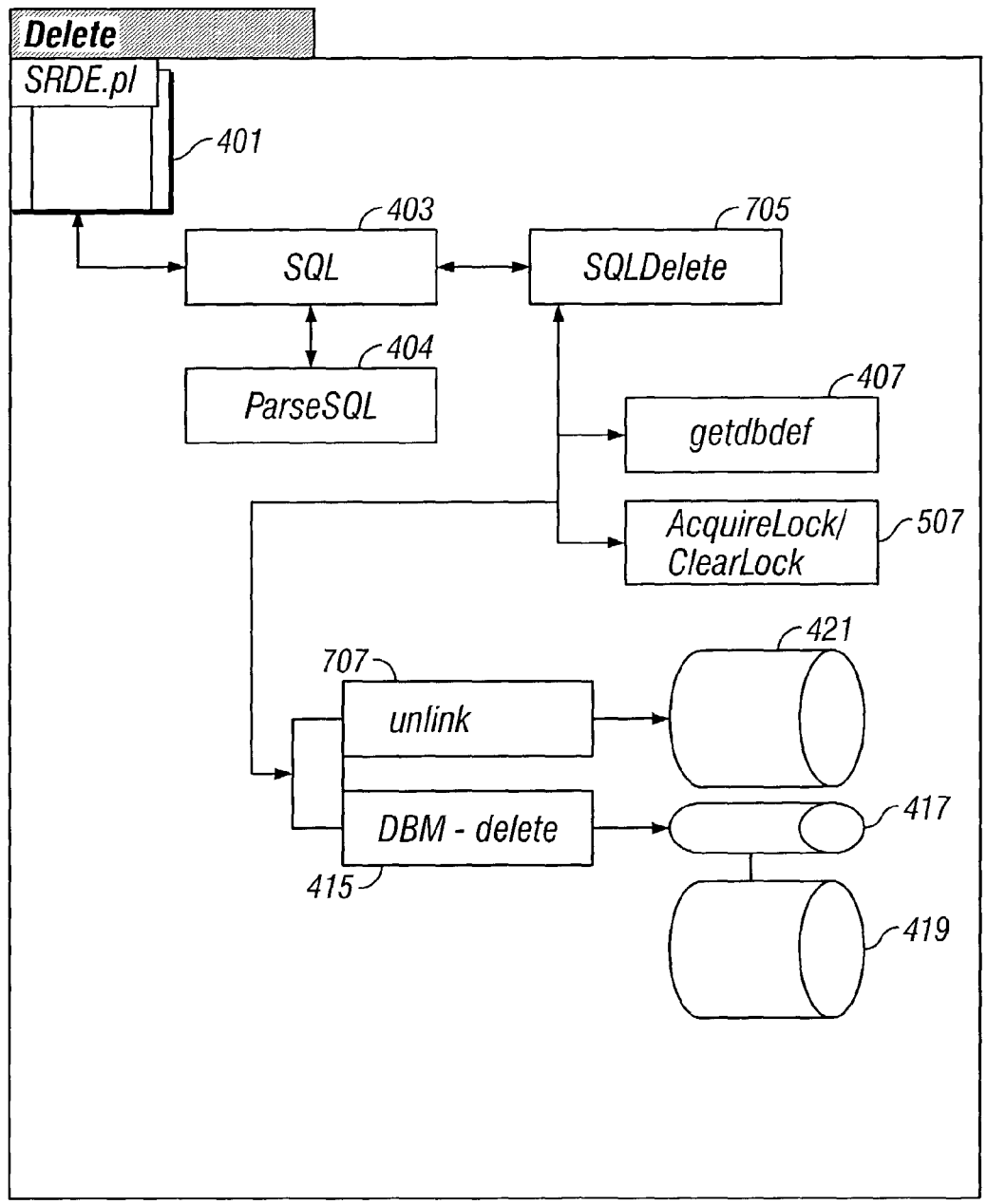
FIG. 7 illustrates the relationships to library routines and the calling process for a delete function.

Referring now to FIG. 7, there is shown a process flow diagram for a Delete function. First, the SRDE.pl library is loaded at 401. The SQL Delete call is made at 403. The SQL is parsed 404 and it is determined that a Delete call is made and is passed off to the SQLDelete routine 705. It is necessary to lock the database before a Delete to maintain database integrity. Processing the SQLDelete 705 command requires the execution of a getdbdef 407 to get the database definition information, and AcquireLock/ClearLock 507 command to lock or unlock the database. If the index points to an external file 421 for large data, the Unlink 707 command is used delete the data file from the file system. Ultimately, the data is deleted using native DBM commands 415 which access the index file 417 and the data file 419.

In addition to the main operations of select, insert, update, and delete, the present system and method also provides for importing and exporting of data. The CSVImport subroutine reads an import ASCII file, formats and validates the data, then calls GetRecord and PutRecord to update or replace the data. The CSVExport routine is simply an additional format option from the select call.

The present system and method is built upon seven core algorithms: record structure, SQL parsing, locking, record insertion/update (including import), record deletion, record selection (including export). The speed of each of the algorithms is derived primarily from the use of system memory to store the manipulated data. Each process and the steps involved in managing the data is described below.

Figure 8:
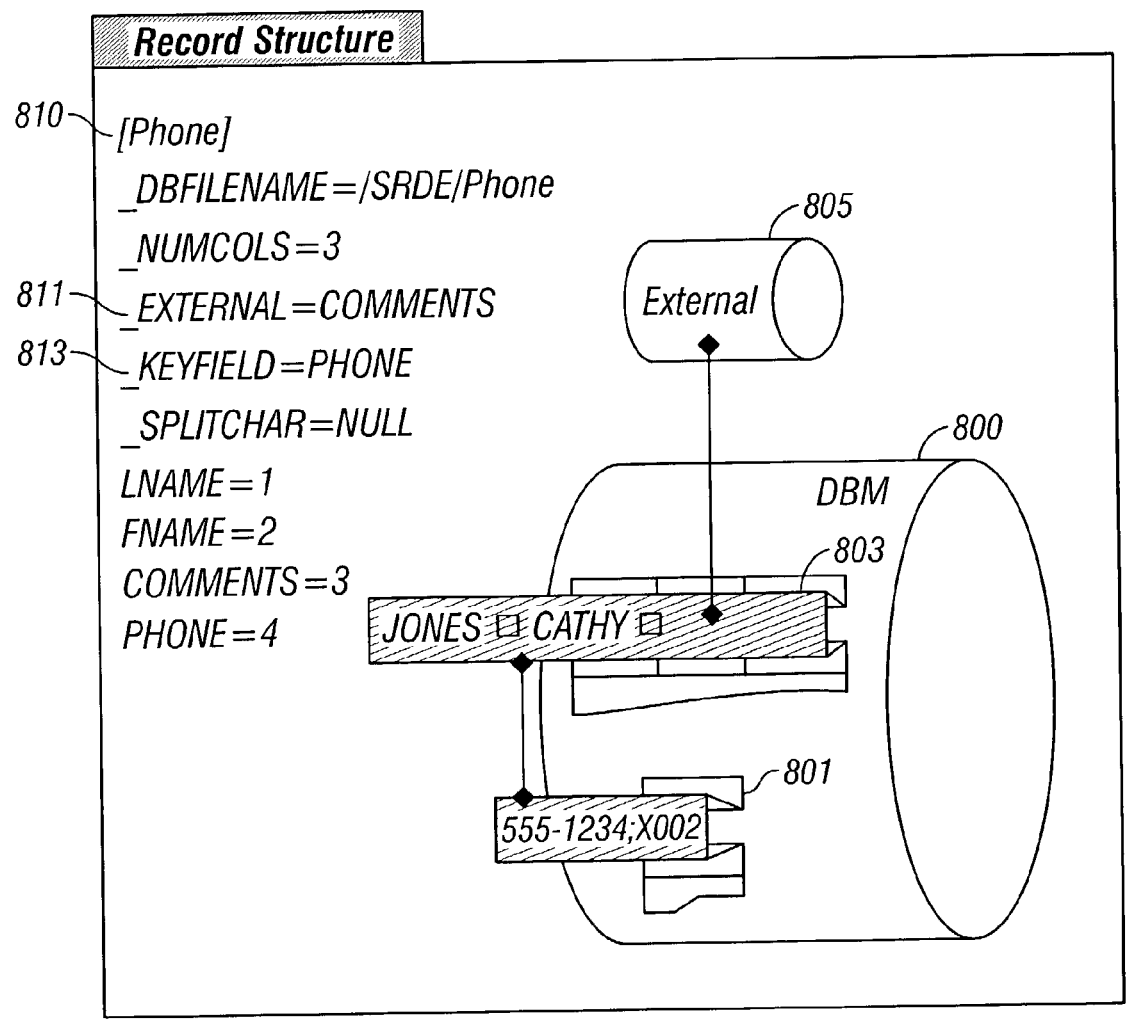
FIG. 8 illustrates the record layout within a DBM file and its relationship to a corresponding database schema.

Record Structure:

Referring now to FIG. 8, there is shown a block diagram illustrating the exemplary record structure. Each record in the database is stored in the DBM data file 800. If one or more columns are expected to extend beyond the DBM 1024 byte limit, external columns are defined to store the data in an additional external data file 805. The external "pointer" 811 is found within the database schema 810 and a placeholder is maintained within the DBM file. Each item in the record is separated by a user-defined ASCII character, ASCII (0)/NULL is used by default. FIG. 8 illustrates the record layout within the DBM file and its relationship to the database schema.

Each record is located in the DBM file using the built-in hash table. The key 813 is designated within the schema and stored in the DBM index file 801 along with the absolute position of the corresponding data in the data file 803. Each column is defined within the record based on its offset position from the record pointer. During data processing, each column can then be addressed as an indexed subset. External data 805 is retrieved after the initial record has been acquired. It is inserted within the vector array at the proper index location. To the calling process, it retrieves the entire record in one pass as a vector array. If the record is returned to the calling process, the column headers are inserted at the top of the array. This allows other subroutines to splice the data and convert it to an associative array referencing each column by name.

SQL Parsing:

The parsing algorithm interprets a modified SQL syntax and returns an associative array to be used by the calling process. The SQL syntax implemented in the present system and method is shown in FIG. 9, in EBNF (Extended Backus-Naur Form) format. All items are treated as text strings during the parsing phase.

Referring now to FIG. 9A, valid commands 901 are create 902, delete 904, import 906, insert 908, export 910, select 912, and update 914. A column list 921 has column names 922 separated by commas. A valid expression consists of a column name 922, one of a plurality of operators ("="|"!="|"<"|">"|"<="|">="|"~") 925 and a quoted value 927. A valid procedure is one of unique 928, sum 930, min 932, max 934, avg 936 and count 938. The procedures use a column name 922 as a parameter, or argument.

The syntax for the seven valid commands in the exemplary embodiment is shown in FIGS. 9A and 9B. Referring now to FIG. 9A, the syntax for create 902A includes a database table name 941 for creation. The delete command 904A defines from which database table the item is to be removed and uses an expression to describe the item. The import command 906A defines from which database table the item is to be imported, and where the item is to be imported. Insert 908A defines a set and into what database table that set should be inserted. Export 910A is similar to import, but in the opposite direction. The export command defines from which database table the item is to be found, and into what filename.

Referring now to FIG. 9B, the select command 912A defines a column list and procedure in order to uniquely identify the items for selection. Update 914A defines the database table for updating and a set and expression to uniquely identify the items for updating.

The elements returned from the ParseSQL subroutine are:

SQL{JOIN}: A subordinate clause to be executed against another table following the initial select command. The supplemental data is merged into each record of the initial select, based on a foreign key defined within the join statement. The foreign key is not forced in the schema, but a designated relationship defined by the calling process. An example is:

select name, addressfrom persondb. location join owner-name,phonefrom persondb.phone where owner-name=name The join item will contain "owner-name,phone from persondb.phone where owner-name=nam"

SQL{COMMAND}: The requested operation (create, select, insert, update, delete, import, or export).

SQL{CSVFILE}: The filename to be imported or exported.

SQL{FIELDS}: The contents of the fields to perform action against. The FIELDS item is parsed using the GetFields subroutine. GetFields checks to ensure that correct column names are used in the SQL command, and removes any duplicate fields requested. It returns a vector array with the list of fields to be operated against.

SQL{SET}: Contains the list of column names and their associated values used during and insert or update command.

SQL{SORTBY}: Optional column name representing the key used to perform output sorting.

SQL{TABLE}: The table to be operated on, the expected syntax is database-name.table-name.

SQL{WHERE}: The contents of the "where" clause. The WHERE item is parsed again in the subroutine Get-Wheres to determine database operation types such as unique, sum, min, max, avg, and count. GetWheres also converts operators (<, >,<=,>=,!=,=,=~) to its respective two-character comparison operator (lt, gt, ,le, ne, ge, eq). The purpose of the conversion is to enable all comparisons to be done as a string or numeric comparison as required by the data. Since the present system and method requires no strict data typing, the data comparison must be determined at the time of the examination. GetWheres returns an associative array broken into each column name, its operator and the operand column name. An example is: where name=fred and date=Dec. 31, 2002 will return an associative array containing: where {NAME}="fred" where{NAME::META}="eq" where {DATE}="Dec. 31, 2002" where{DATE::META}="eq".

Resource Locking:

An exemplary embodiment does not physically lock the database, but rather locks an implied resource. The AcquireLock and ClearLock take the resource name as a parameter. The parameter represents the resource to be controlled for access. Once a resource is locked, all other lock requests are queued until a call to ClearLock is made, or the calling process dies. AcquireLock checks the status of the locking process and will grant the next lock request on its termination.

Figure 10:
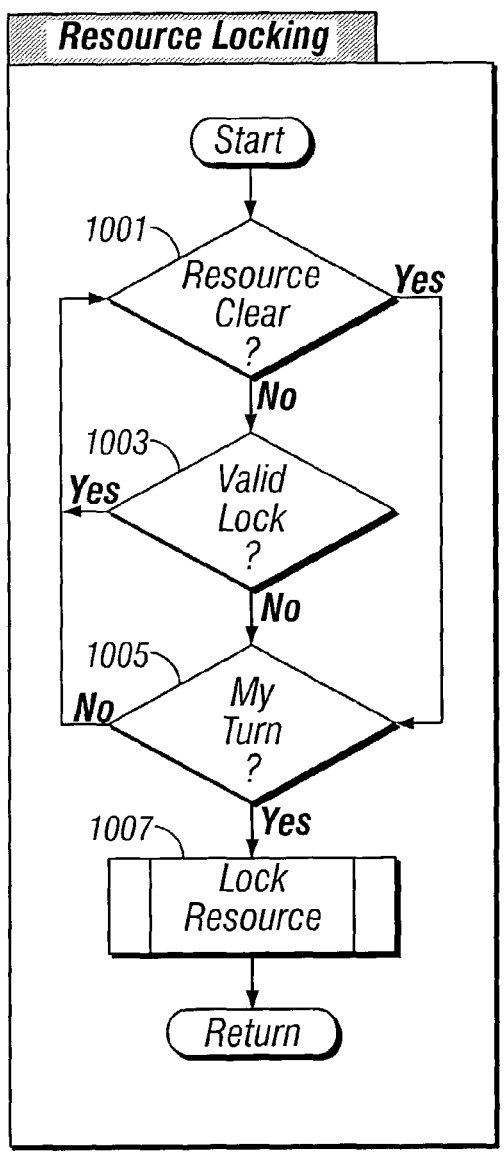
FIG. 10 shows a flow diagram for an exemplary resource locking method.

Referring now to FIG. 10, there is shown a flow diagram for an exemplary resource locking method. First, it is determined whether the resource is clear, in step 1001. If it is, then it is determined whether it is the requesting process' turn with the resource in step 1005. If so, then the resource is locked. If the resource was not clear, then a determination is made as to whether the current lock is valid in step 1003. If so, then the step 1001 is repeated until the lock resource is clear to be locked. If the current lock is not valid, as determined in step 1003, then a determination is made as to whether it is the requesting process' turn with the resource in step 1005. Thus, the requesting process keeps checking the status of the resource until it can be locked in step 1007.

Record Insertion and Updates:

Inserting a record into the database is a matter of packing the items in a row and using the features of DBM to add the data into the database. If large columns are required in the implementation, a call to PutExternalRecord is made to insert each item into the associated file. A check is made to ensure that a duplicate record is not added on insertion. If the record is not found on update, the data will be inserted as if the insert command were issued. Insertion and updates are handled primarily through the GetRecord and PutRecord subroutines.

Figure 11:
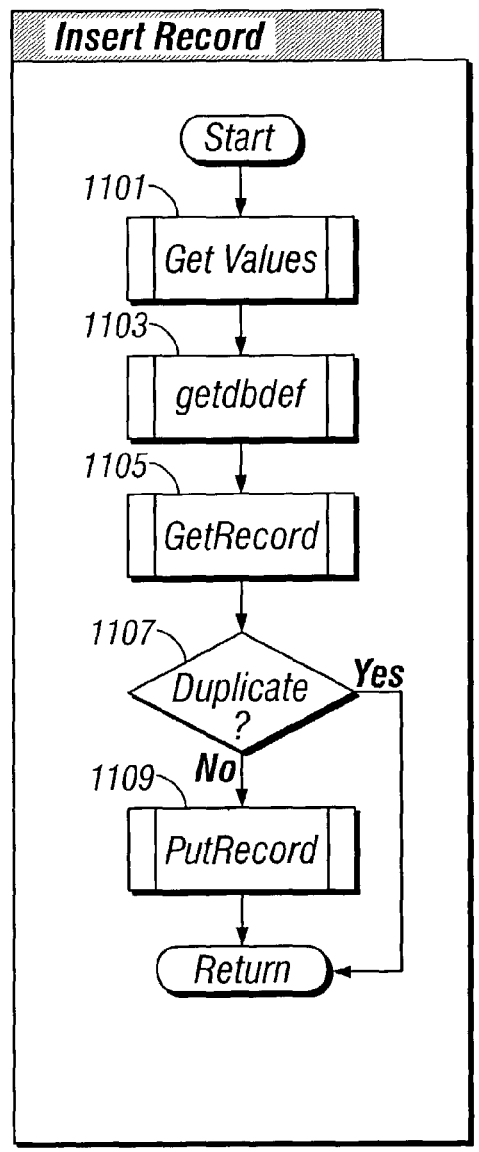
FIG. 11 shows a flow diagram for an exemplary method of record insertion.

Referring now to FIG. 11, there is shown a flow diagram for an exemplary method of record insertion. The GetValues routine 1101 matches each column value with the associated column name, and loads them into an associative array. This method allows the process to build the record for insertion or update by directly accessing the column data instead of indexing by column offset. The database table definition is retrieved in step 1103 with the getdbdef function. The record is retrieved in step 1105 with the GetRecord function. A determination is made as to whether the record is a duplicate by examining the primary key and comparing it with keys already stored in the hash file. in step 1107. If it is not duplicated, then the record is inserted in step 1109 with the PutRecord function. If it is duplicated, then the process returns.

Record Deletion:

Deleting records from the database involves calling DBM's delete function and unlinking the file block if external records are defined. The specific keys are located by making a call to SQLSelect with the "keys" option. In this way, the calling process can supply a where clause identifying a subset of records which are marked for deletion.

Importing:

The import algorithm can read files on a comma-separated value format and insert the new record, replace an existing record, or merge supplied fields into an existing record. The latter option is invoked with the merge option in the SQL command. If the merge option is selected, all columns supplied within the CSV file will replace matching columns in the database. The remaining columns will be left intact. If a matching record is not found, the CSV record will become a new record in the database with the missing columns left empty. Importing records involves an initial step to convert the CSV-formatted data into a record item. The CSVImport subroutine reads one line of the import file at a time. The CSVFields subroutine converts each line into a vector array. A call to GetRecord will return either a blank associative array (indicating no match was found), or a record with the matching primary key. Each matching column from the database is replaced with the associated field from the CSV file if the merge option is supplied. If the merge option is not supplied, the record will be cleared and all fields are replaced with the imported data.

Exporting:

Exporting data is accomplished as a formatted selection from the database. Export retrieves the data from the database via the SQLSelect subroutine, then calls CSVFormat to convert the vector array into a CSV-formatted line. The resulting line is written to a file specified in the SQL command.

Selection:

Selecting records from the database is accomplished by examining each data item suggested by the where clause of the SQL statement. If external columns are required from the select they are retrieved and merged with the DBM data into a vector array. If the table key is supplied in the where clause, non-matching keys are eliminated before the associated values are compared. This step speeds the selection phase by ignoring DBM and external records that have been eliminated with the index-key comparison. After the initial comparison, each possible record is examined and compared using the information in the where clause. The SQLParse subroutine returns the associative array with the operators required to compare each column. Regular expression matching is inserted using the // terminators when comparing based on a regular expression operator. Procedure calls, (unique, sum, min, max, avg, and count) are invoked if the item passes the matching criteria for all columns specified in the where clause. And finally, a join clause can return linked data between two tables using the SQLJoin subroutine. Outlined below is the pseudo code used in the selection algorithm.

```
Localize/Initialize variables
Convert where clause to associative array
Convert fields clause to associative array
Determine if external columns are required
Determine if procedure is requested—(unique, sum, min,
    max, avg,count)
Determine the number of columns that will be returned
If key is used in where clause
    Compare keys with DBM index
    Create "dbkeys" vector array with matching keys
Else
    Create "dbkeys" vector array of all keys
EndIf
For each key in "dbkeys" array
    Get record from DBM data file
    Convert record to indexed vector array "seldata"
    If External record needed
        Get External portion of record
        Insert external record into indexed vector array "sel-
            data"
    Endif
    For Each field in where clause
        Compare each field in the array requested from the
            where clause
    EndFor
    If all comparisons matched
        If sumo, min( ), max( ), count( ), avg( ) were
            requested
            sum( ): Add numeric data to existing "sum" vari-
                able
```

```
min( ): Replace existing min" value with new
    minimum if less than existing
max( ): Replace existing "max" value with new
    maximum if greater than existing
count( ): Update existing "count" value by 1
avg( ): Update existing "average" variable with
    new average
EndIf
If unique requested
    update "unique" variable with new value
EndIf
Push record into vector array "data"
    EndIf
EndFor
If sort requested
    sort "data"
EndIf
If join requested
    Call select and merge with "data"
EndIf
return (return-code, message, num-columns, "data")
```

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. An extended database management (DBM) database, comprising:
    a DBM database having a schema defining a plurality of table records, each record having a structure defined by a filename, a number of columns, a key field, and an optional external field, wherein the DBM database comprises a plurality of DBM index and DBM data files, each index file corresponding to a data file and optional external data files, wherein the DBM data files have limited memory allocation for storing data associated with each record and the external data files are capable of storing data larger than can be stored in the DBM data files;
    a front end to the DBM database using structured query language SQL calls to select records in the DBM database; and
    means for locking and unlocking the DBM database to maintain database integrity during database access, wherein the means for locking and unlocking uses files residing on the system as semaphores to identify a locked/unlocked state.

2. The extended DBM database as recited in claim 1, wherein the means for locking and unlocking the DBM database uses a table level resource locking mechanism to lock writes and allow dirty reads of the data.

3. The extended DBM database as recited in claim 1, wherein use of an external data file in a table record is defined in the schema, and the external data files store data larger than 1024 bytes and a pointer in the DBM data file identifies the external data file and location.

4. The extended DBM database as recited in claim 3, wherein the means for locking and unlocking the DBM database uses a table level resource locking mechanism to lock writes and allow dirty reads of the data.

5. The extended DBM database as recited in claim 1, wherein the front end to the DBM database performs a plurality of functions extending native DBM functionality.

6. The extended DBM database as recited in claim 5, wherein the plurality of functions is selected from the group consisting of table creation, record selection, record insertion, record update, record deletion, record importation, and record exportation.

7. The extended DBM database as recited in claim 6, wherein the means for locking and unlocking the DBM database uses a table level resource locking mechanism to lock writes and allow dirty reads of the data.

8. The extended DBM database as recited in claim 1, the front end further comprising:
    a first section of computer code for maintaining record structure;
    a second section of computer code for performing SQL parsing;
    a third section of computer code for locking the DBM database;
    a fourth section of computer code for performing record insertion;
    a fifth section of computer code for performing record update;
    a sixth section of computer code for performing record deletion; and
    a seventh section of computer code for performing record selection.

9. The extended DBM database as recited in claim 8, wherein the front end is coded in Perl script.

10. A method for extending a DBM database using a structured query language (SQL) front end, the method comprising:
    generating a DBM database schema for a DBM database, the schema defining a plurality of table records, each record having a structure defined by a filename, a number of columns, a key field, and an optional external field, wherein the DBM database comprises a plurality of DBM index and DBM data files, each index file corresponding to a data file and optional external data files, wherein the DBM data files have limited memory allocation for storing data associated with each record and the external data files are capable of storing data larger than can be stored in the DBM data file;
    accessing records in the DBM database using a SQL front end, wherein the front end performs a plurality of functions extending native DBM functionality;
    acquiring a resource lock of a table record, if necessary, to maintain database integrity before accessing the table record; and
    releasing a resource lock of a table record after accessing the table record, wherein files used as semaphores identify a locked or unlocked state of the table record.

11. The method as recited in claim 10, further comprising:
    using a regular expression to search the DBM database; and
    selecting at least one item in the DBM database based on a return value of the regular expression search.

12. The method as recited in claim 10, wherein the plurality of functions is selected from the group consisting of table creation, record selection, record insertion, record update, record deletion, record importation, and record exportation.

13. The method as recited in claim 10, wherein the accessing step further comprises:
    accessing a table record in a DBM data file having a pointer to an external file; and
    accessing a record from the external file pointed to by the accessed table record.

14. The method as recited in claim 10, wherein the front end is coded in Perl script.

15. A method for using an extended a database management (DBM) database having a structured query language (SQL) front end, the method comprising:
  accessing records in the DBM database using a SQL front end, wherein the DBM database is generated using a DBM database schema for a DBM database, the schema defining a plurality of table records, each record having a structure defined by a filename, a number of columns, a key field, and an optional external field, wherein the DBM database comprises a plurality of DBM index and DBM data files, each index file corresponding to a data file and optional external data files, wherein the DBM data files have limited memory allocation for storing data associated with each record and the external data files are capable of storing data larger than can be stored in the DBM data file, wherein the front end performs a plurality of functions extending native DBM functionality;
  acquiring a resource lock of a table record, if necessary, to maintain database integrity before accessing the table record; and
  releasing the resource lock of a table record, if necessary, after accessing the table record, wherein files used as semaphores identify a locked or unlocked state of the table record.

16. The method as recited in claim 15, wherein accessing records further comprises using a regular expression in a SQL command as selection criteria for accessed records.

17. The method as recited in claim 15, wherein accessing records further comprises retrieving selected records, wherein the retrieved records are returned as associative arrays.

18. The method as recited in claim 15, wherein the DBM database is accessed using native DBM commands without the assistance of a database management service.

19. The method as recited in claim 15, wherein the accessing records further comprises:
  accessing a table record in a DBM data file having a pointer to an external file; and
  accessing a record from the external file pointed to by the accessed table record.

20. The method as recited in claim 15, wherein the DBM database resides on a host system and accessing records utilizes security methods of the host system.

21. A computer-based application using a simplified relational database
  extension, comprising:
    computer application code running on a computing device, the application computer code being used for a selected application and needing access to a database;
    a database accessible to the computer application code, the database being implemented in a DBM database for storing and retrieving data needed by the computer-based application, the DBM database developed from a schema defining a plurality of table records, each record having a structure defined by a filename, a number of columns, a key field, and an optional external field, wherein the DBM database comprises a plurality of DBM index and DBM data files, each index file corresponding to a data file and optional external data files, wherein the DBM data files have limited memory allocation for storing data associated with each record and the external data files are capable of storing data larger than can be stored in the DBM data files, and wherein data stored in the DBM is dependent on the computer-based application; and
    a front end to the DBM database using structured query language SQL calls to select records in the DBM database, wherein the front end is used by the computer-based application as an interface to the DBM database.

22. The computer-based application as recited in claim 21, wherein use of an external data file in a table record is defined in the schema, and the external data files store data larger than 1024 bytes and a pointer in the DBM data file identifies the external data file and location.

23. The computer-based application as recited in claim 22, further comprising:
  means for locking and unlocking the DBM database to maintain database integrity during database access.

24. The computer-based application as recited in claim 23, wherein the means for locking and unlocking the DBM database uses a table level resource locking mechanism to lock writes and allow dirty reads of the data.

25. The computer-based application as recited in claim 24, wherein the means for locking and unlocking uses files residing on the system as semaphores to identify a locked/unlocked state.

26. The computer-based application as recited in claim 21, wherein the front end to the DBM database performs a plurality of functions extending native DBM functionality.

27. The computer-based application as recited in claim 26, wherein the plurality of functions is selected from the group consisting of table creation, record selection, record insertion, record update, record deletion, record importation, and record exportation.

28. The computer-based application as recited in claim 21, further comprising:
  means for locking and unlocking the DBM database to maintain database integrity during database access.

29. The computer-based application as recited in claim 25, wherein the means for locking and unlocking the DBM database uses a table level resource locking mechanism to lock writes and allow dirty reads of the data.

30. The computer-based application as recited in claim 29, wherein the means for locking and unlocking uses files residing on the system as semaphores to identify a locked/unlocked state.

31. The computer-based application as recited in claim 21, the front end further comprising:
  a first section of computer code for maintaining record structure;
  a second section of computer code for performing SQL parsing;
  a third section of computer code for locking the DBM database;
  a fourth section of computer code for performing record insertion;
  a fifth section of computer code for performing record update;
  a sixth section of computer code for performing record deletion; and
  a seventh section of computer code for performing record selection.

32. The computer-based application as recited in claim 31, wherein the front end is coded in Perl script.

33. An extended database management (DBM) database, comprising:
  a DBM database having a schema defining a plurality of table records, each record having a structure defined by a filename, a number of columns, and a key field, wherein the DBM database comprises a plurality of DBM index and DBM data files, each index file corresponding to a data file; and a front end to the DBM database using structured query language SQL calls to select records in the DBM database, wherein typical database management functions are performed without the assistance of a database management service.

34. The extended DBM database as recited in claim 33, wherein the DBM database resides on a host system and accesses records utilizing security methods of the host system.

35. The extended DBM database as recited in claim 33, wherein records are accessed by retrieving selected records, wherein the retrieved records are returned as associative arrays, and wherein the retrieval method is data type-independent.

36. The extended DBM database as recited in claim 35, wherein records are accessed using a regular expression in a SQL command as selection criteria for accessed records.

37. The extended DBM database as recited in claim 33, further comprising:

means for locking and unlocking the DBM database to maintain database integrity during database access, wherein the means for locking and unlocking the DBM database uses a table level resource locking mechanism to lock writes and allow dirty reads of the data.

38. An extended database management (DBM) database, comprising:

a DBM database having a schema defining a plurality of table records, each record having a structure defined by a filename, a number of columns, and a key field, wherein the DBM database comprises a plurality of DBM index and DBM data files, each index file corresponding to a data file; and a front end to the DBM database using structured query language SQL calls to select records in the DBM database, wherein records are accessed by retrieving selected records, the retrieved records are returned as associative arrays, the retrieval method is data type-independent and the typical database management functions are performed without the assistance of a database management service.

39. The extended DBM database as recited in claim 38, wherein the DBM database resides on a host system and accesses records utilizing security methods of the host system.

40. The extended DBM database as recited in claim 38, wherein the front end allows retrieval of data from the DBM database using a regular expression in a SQL command as selection criteria for accessed records.

41. The extended DBM database as recited in claim 38, further comprising:

means for locking and unlocking the DBM database to maintain database integrity during database access, wherein the means for locking and unlocking the DBM database uses a table level resource locking mechanism to lock writes and allow dirty reads of the data.

* * * * *